US008832683B2

(12) United States Patent
Heim

(10) Patent No.: US 8,832,683 B2
(45) Date of Patent: *Sep. 9, 2014

(54) USING MEMORY-RELATED METRICS OF HOST MACHINE FOR TRIGGERING LOAD BALANCING THAT MIGRATE VIRTUAL MACHINE

(75) Inventor: Itamar Heim, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 484 days.

This patent is subject to a terminal disclaimer.

(21) Appl. No.: 12/627,933

(22) Filed: Nov. 30, 2009

(65) Prior Publication Data

US 2011/0131569 A1 Jun. 2, 2011

(51) Int. Cl.
G06F 9/455 (2006.01)
G06F 9/46 (2006.01)

(52) U.S. Cl.
USPC .................... 718/1; 718/104; 718/105

(58) Field of Classification Search
CPC ... G06F 9/4558; G06F 9/5088; G06F 9/4856; G06F 2009/4557; G06F 2009/45583
USPC ............ 718/1, 102, 104, 105; 711/1, 6, 147, 711/E12.001
See application file for complete search history.

(56) References Cited

U.S. PATENT DOCUMENTS

| 7,203,944 | B1 | 4/2007 | van Rietschote et al. |
| 7,290,259 | B2 * | 10/2007 | Tanaka et al. ...................... 718/1 |
| 7,444,459 | B2 * | 10/2008 | Johnson ............................. 711/6 |
| 7,673,113 | B2 * | 3/2010 | Sugumar et al. ............. 711/170 |
| 7,716,667 | B2 * | 5/2010 | van Rietschote et al. ......... 718/1 |
| 7,730,486 | B2 * | 6/2010 | Herington .......................... 718/1 |
| 7,814,495 | B1 * | 10/2010 | Lim et al. ....................... 718/104 |
| 7,904,540 | B2 * | 3/2011 | Hadad et al. .................. 709/223 |
| 8,140,812 | B2 | 3/2012 | Arroyo et al. |
| 8,156,490 | B2 * | 4/2012 | Bozek et al. ...................... 718/1 |
| 8,161,475 | B2 * | 4/2012 | Araujo et al. ...................... 718/1 |
| 8,209,687 | B2 * | 6/2012 | Yuyitung et al. .................. 718/1 |
| 8,458,717 | B1 * | 6/2013 | Keagy et al. .................. 718/104 |
| 2005/0268298 | A1 | 12/2005 | Hunt et al. |
| 2006/0069761 | A1 | 3/2006 | Singh et al. |
| 2007/0130566 | A1 | 6/2007 | van Rietschote et al. |

(Continued)

OTHER PUBLICATIONS

USPTO, Office Action for U.S. Appl. No. 12/627,943 mailed Mar. 19, 2012.

(Continued)

*Primary Examiner* — Meng An
*Assistant Examiner* — Abu Ghaffari
(74) *Attorney, Agent, or Firm* — Lowenstein Sandler LLP

(57) ABSTRACT

A mechanism for load balancing in a memory-constrained virtualization system is disclosed. A method of embodiments of the invention includes determining that one or more collected metrics have triggered a load balancing operation of a host controller machine, wherein the one or more collected metrics include memory-related metrics of one or more host machines managed by the host controller machine and of an overall system of the host controller machine. The method further includes selecting a host machine of the one or more host machines to migrate a virtual machine (VM) from as part of the load balancing operation and selecting a VM of a plurality of VMs hosted by the selected host machine to load balance migrate from the selected host machine, wherein the selecting the host machine and the selecting of the VM includes consideration of the memory-related metrics of the host machine and the VM.

15 Claims, 4 Drawing Sheets

(56) References Cited

U.S. PATENT DOCUMENTS

| | | | |
|---|---|---|---|
| 2007/0169121 | A1 | 7/2007 | Hunt et al. |
| 2007/0214456 | A1 | 9/2007 | Casey et al. |
| 2007/0271560 | A1 | 11/2007 | Wahlert et al. |
| 2008/0184229 | A1* | 7/2008 | Rosu et al. .................. 718/1 |
| 2008/0295096 | A1 | 11/2008 | Beaty et al. |
| 2009/0070771 | A1* | 3/2009 | Yuyitung et al. ............ 718/105 |
| 2010/0005465 | A1 | 1/2010 | Kawato |
| 2010/0050180 | A1 | 2/2010 | Amsterdam et al. |
| 2010/0257523 | A1 | 10/2010 | Frank |
| 2010/0269109 | A1 | 10/2010 | Cartales |
| 2010/0332657 | A1 | 12/2010 | Elyashev et al. |
| 2010/0332658 | A1 | 12/2010 | Elyashev |
| 2011/0004735 | A1 | 1/2011 | Arroyo et al. |
| 2011/0060832 | A1 | 3/2011 | Govil et al. |
| 2011/0106949 | A1* | 5/2011 | Patel et al. .................. 709/226 |
| 2011/0119427 | A1 | 5/2011 | Dow et al. |
| 2011/0119670 | A1 | 5/2011 | Sugumar et al. |
| 2011/0131568 | A1 | 6/2011 | Heim |
| 2011/0225277 | A1 | 9/2011 | Freimuth et al. |
| 2011/0314470 | A1 | 12/2011 | Elyashev et al. |

OTHER PUBLICATIONS

USPTO, Office Action for U.S. Appl. No. 12/627,950 mailed Mar. 22, 2012.
USPTO, Notice of Allowance for U.S. Appl. No. 12/627,929 mailed Apr. 20, 2012.
USPTO, Corrected Notice of Allowance for U.S. Appl. No. 12/627,929 mailed Jun. 7, 2012.
USPTO, Notice of Allowance for U.S. Appl. No. 12/627,929 mailed Jul. 30, 2012.
USPTO, Office Action for U.S. Appl. No. 12/852,258 mailed Sep. 5, 2012.
Galvin, Peter Baer, "VMware vSphere Vs. Microsoft Hyper-V: A Technical Analysis," Corporate Technologies, CTI Strategy White Paper, 2009, 32 pages.
USPTO, Final Office Action for U.S. Appl. No. 12/627,943 mailed Oct. 15, 2012.
USPTO, Advisory Action for U.S. Appl. No. 12/627,943 mailed Jan. 3, 2013.
USPTO, Final Office Action for U.S. Appl. No. 12/627,950 mailed Oct. 12, 2012.
USPTO, Advisory Action for U.S. Appl. No. 12/627,950 mailed Dec. 20, 2012.
USPTO, Final Office Action for U.S. Appl. No. 12/852,258 mailed Feb. 6, 2013.
USPTO, Office Action for U.S. Appl. No. 12/627,943 mailed Apr. 10, 2013.
USPTO, Notice of Allowance for U.S. Appl. No. 12/627,950 mailed May 16, 2013.
USPTO, Advisory Action for U.S. Appl. No. 12/852,258 mailed Apr. 11, 2013.
USPTO, Notice of Allowance for U.S. Appl. No. 12/627,946 mailed Jul. 18, 2013.

* cited by examiner

200

Collect and monitor load balancing metrics from all managed host machines, where the metrics include, but are not limited to, memory-related metrics
210

Determine that one or more of the metrics have triggered a load balancing operation
220

Determine candidate hosts for load balancing operation
230

Select a host from the candidate hosts to migrate a VM from, where the selection of the host includes consideration of the memory-related metrics of the host
240

*Fig. 2*

USING MEMORY-RELATED METRICS OF HOST MACHINE FOR TRIGGERING LOAD BALANCING THAT MIGRATE VIRTUAL MACHINE

RELATED APPLICATION

The present application is related to co-filed U.S. patent application Ser. No. 12/627,943 entitled "Mechanism for Target Host Optimization in a Load Balancing Host and Virtual Machine (VM) Selection Algorithm", which is assigned to the assignee of the present application.

TECHNICAL FIELD

The embodiments of the invention relate generally to virtual machine (VM) systems and, more specifically, relate to a mechanism for load balancing in a memory-constrained virtualization system.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

A virtualization system is a dynamic system. A change in load (e.g., set of resources consumed) on a host, or the balance of load on hosts in the system, can occur because VMs are scheduled to start in different points in time in the system or because VMs stop running in different points in time in the system. Even without any change in how VMs are running on each host, the load created by VMs on each host can vary in several metrics causing unbalanced load. Most commonly, the amount of CPU, memory and I/O required by each VM varies as it performs different tasks.

A load balancing algorithm may be used in such a system to try and balance the load on the different hosts in the system, usually by moving VMs from highly-utilized hosts to less-utilized hosts. This process improves the health of the system, as it prevents a disturbance in the level of service provided by hosts to the virtual machines running on them.

Typically, a load balancing algorithm is based on CPU utilization. A simple example of a load balancing algorithm based on CPU utilization follows: If the average CPU load on a host A is above X percent for more than Y minutes, and there is a host B with less than Z percent of CPU utilization in those Y minutes, then VMs can be migrated from host A to host B, thus reducing the CPU load on host A by sharing the load with host B.

With advances in virtualization systems, memory optimizations are now possible between multiple VMs. This is because VMs may run an operating system (OS) and processes with the same memory image as other VMs. In such a case, a host process may be used to optimize memory utilization on the host, by referencing identical memory pages from multiple VMs to the same single memory page. This is known as memory sharing. Memory sharing reduces the amount of memory required in the host when running VMs with shared memory.

As such, a load balancing algorithm for a virtualization system that takes into account memory considerations, in addition to the other considerations for load balancing, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a flow diagram illustrating a method for shared memory history optimization in a host selection algorithm for VM placement;

DETAILED DESCRIPTION

Figure 1:
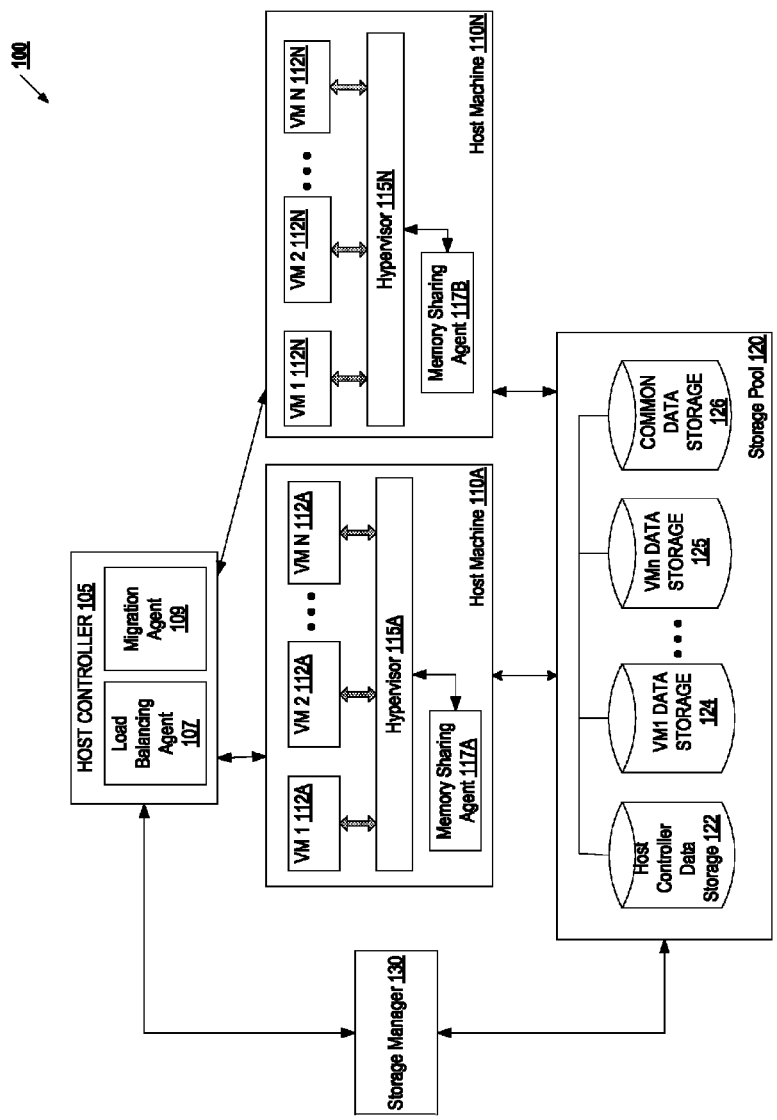
FIG. 1 is a block diagram of an exemplary virtualization architecture in which embodiments of the present invention may operate.

Embodiments of the invention provide a mechanism for load balancing in a memory-constrained virtualization system. A method of embodiments of the invention includes determining that one or more collected metrics have triggered a load balancing operation of a host controller machine, wherein the one or more collected metrics include memory-related metrics of one or more host machines managed by the host controller machine and of an overall system of the host controller machine. The method further includes selecting a host machine of the one or more host machines to migrate a virtual machine (VM) from as part of the load balancing operation and selecting a VM of a plurality of VMs hosted by the selected host machine to load balance migrate from the selected host machine, wherein the selecting the host machine and the selecting of the VM includes consideration of the memory-related metrics of the host machine and the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for load balancing in a memory-constrained virtualization system. Embodiments of the invention provide for memory-oriented load balancing by combining memory considerations with other considerations for load balancing. The memory consideration may include extending the load balancing operation to consider an amount of memory utilization, over commit, swap usage, paging ratio, memory sharing, or other memory-related metrics. The memory considerations in the load balancing algorithm may be given a higher weight (or some other method of affecting the selection algorithm) if memory is constrained in a host and/or in the overall system (to improve memory sharing and reduce memory utilization).

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a guest operating system (OS) that may be different from one another. The guest OS may include Microsoft Windows, Linux, Solaris, Mac OS, etc. The host 110A, 110N may include a hypervisor 115A, 1125N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124, 125 designated for individual VMs 112A, 112N. When a VM 112A, 112N is created, it is associated with its own individual data storage 124, 125, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In many cases, a VM 112A, 112N may run an OS and processes that utilize the same memory image as other VMs. In such cases, a process of the host machine 110A, 110N may be used to optimize memory utilization on the host, by referencing identical memory pages from multiple VMs to the same single memory page. This is known as memory sharing.

In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 11N storing identical memory pages in their separate data storage 122, the memory sharing agent 117A, 117N can identify these shared pages and store one copy of these memory pages in the common data storage 126 that may be accessed by each VM 112A, 112N. Memory sharing reduces the amount of memory required in the host when running VMs with shared memory. Thus, virtualization system 100 would benefit from a load balancing algorithm optimized to consider memory as a factor.

In one embodiment, host controller 105 may include a load balancing agent 107. Load balancing agent 107 is responsible for balancing the load between different host machines 110A, 110N in virtualization system 100. In one embodiment, load balancing agent 107 performs a load balancing algorithm to balance load in system 100 by selecting a host 110A, 110N and VM 112A, 112N to be load balance migrated. Once the load balancing agent 107 has selected a host 110A, 110N and VM 112A, 112N to be load balance migrated, control is passed to a migration agent 109 to determine the host 110A, 110N that the selected VM 112A, 112N should be migrated to and handle the migration process between those hosts 110A, 110N.

A load balancing algorithm typically includes, but is not limited to, the following components: (1) load balancing trigger detection; (2) host selection; (3) VM selection; and (4) loop detection and prevention. Load balancing trigger detection is the determination of when load balancing needs to happen. This could be driven from metrics collected over time per host 110A-110N, or the overall load in the system 100. Host selection determines which host to select as the source for migrating VMs from. This host can be the most congested in the system in a service-level load balancing algorithm, or the least congested, in a power-saving load balancing algorithm.

VM selection occurs after a host machine has been selected and determines which VM in the selected host should be migrated. Loop detection and prevention can be part of either of the host and/or VM selection, or as a separate process. Loop detection and prevention optimizes the load balancing process to prevent "endless loops" of VMs migrating between hosts, in a doomed attempt to load balance the system.

Embodiments of the invention provide for memory-oriented load balancing by combining memory considerations with other considerations in the load balancing algorithm described above. The memory considerations may be used as a set of exclusion criteria, a set of comparison ordering algorithms, or other methods for detection and selection. In one embodiment, the memory considerations in the load balancing algorithm may be given a higher weight (or some other method of affecting the selection algorithm) in the load balancing algorithm if memory is constrained in a host or in the overall system (to improve memory sharing and reduce memory utilization).

In one embodiment, the trigger detection component of the load balancing algorithm may be extended to use an amount of memory utilization, over commit, swap usage, paging ratio, or other memory-related metrics to decide if there is a need to perform a load balancing migration. In another embodiment, the host detection component of the load balancing algorithm may be extended to weigh the amount of memory utilization, over commit, swap usage, paging ratio, or other memory related metrics in the host to prioritize the host as a candidate for migration due to load balancing.

In yet another embodiment, the VM selection component of the load balancing algorithm may be extended to weigh: (1) the VMs with the smallest memory set, in order to provide the fastest migration from the selected host; (2) the VMs with the largest memory set, in order to alleviate as much memory as possible from the selected host; (3) the paging ratio incurred by each VM (as seen by the host), in order to reduce the overhead of VMs causing paging in the host; (4) the paging ratio incurred by each VM (as monitored in the VM), in order to reduce the I/O related to memory aspects; and/or (5) the level of shared memory the VM has with other VMs on the selected host.

With respect to the level of shared memory the VM has with other VMs on the selected host, embodiments of the invention may give a lower score for a VM with high sharing, as migrating it will not alleviate the memory load because the memory set has been mostly shared. Conversely, embodiments of the invention may give a higher score for a VM with low sharing, as it is hurting the sharing effort on the host, consuming a percentage of memory relative to its memory set (unlike a VM with high sharing, which consumes a fraction of its potential memory set).

FIG. 2 is a flow diagram illustrating a method 200 for load balancing in a memory-constrained virtualization system according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by load balancing agent 107 described with respect to FIG. 1.

Method 200 begins at block 210 where load balancing metrics are collected and monitored from all managed host machines. In embodiments of the invention, the load balancing metrics include, but are not limited to memory-related metrics, such as an amount of memory utilization, over commit, swap usage, paging ratio, or other memory-related metrics. In one embodiment, the load balance metrics are continuously received from a hypervisor managing and monitoring VMs on a host machine.

Then, at block 220, it is determined that one or more of the collected and monitored metrics have triggered a load balancing operation. Embodiments of the invention extend the collected and monitored metrics to include memory-related metrics, such as an amount of memory utilization, over commit, swap usage, paging ratio, or other memory-related metrics to decide if there is a need to perform a load balancing migration.

In one embodiment, the load balancing agent maintains various configured conditions that the memory-related metrics should meet. For instance, the configured conditions may be service-based, so that the metrics should maintain levels providing the best service to an end user. In some cases, for example, the configured conditions may be power based, so that the metrics should maintain levels providing the best power savings to the virtualization system, or an individual host. When any of the metrics reach levels that do not provide the configured conditions, then the load balancing operation is triggered. In some embodiments, an individual host may trigger the load balancing operation, while in other embodiments the metrics of the overall system may trigger the load balancing operation.

Subsequently, at block 230, potential candidate hosts are determined for the load balancing operation. The potential candidate hosts are all of running host machines that are capable of being a source of a VM to load balance migrate. In one embodiment, this includes those hosts capable of providing the necessary resources, such as CPU processing power and memory space. In some embodiments, the number of potential candidate hosts may be limited to a certain number or percentage based on particular implementations of the host selection algorithm.

At block 240, one of the potential candidate hosts is selected to be the source of a VM to be load balance migrated. In embodiments of the invention, the selection of the host includes consideration of memory-related metrics of the hosts, including, but not limited to, the amount of memory utilization, over commit, swap usage, paging ratio, or other memory-related metrics. For instance, those hosts having less memory constraint based on the memory-related metrics may be given a higher weight in the host selection decision and thereby have a higher chance of being the selected host and providing better memory utilization in the virtualization system.

Figure 3:
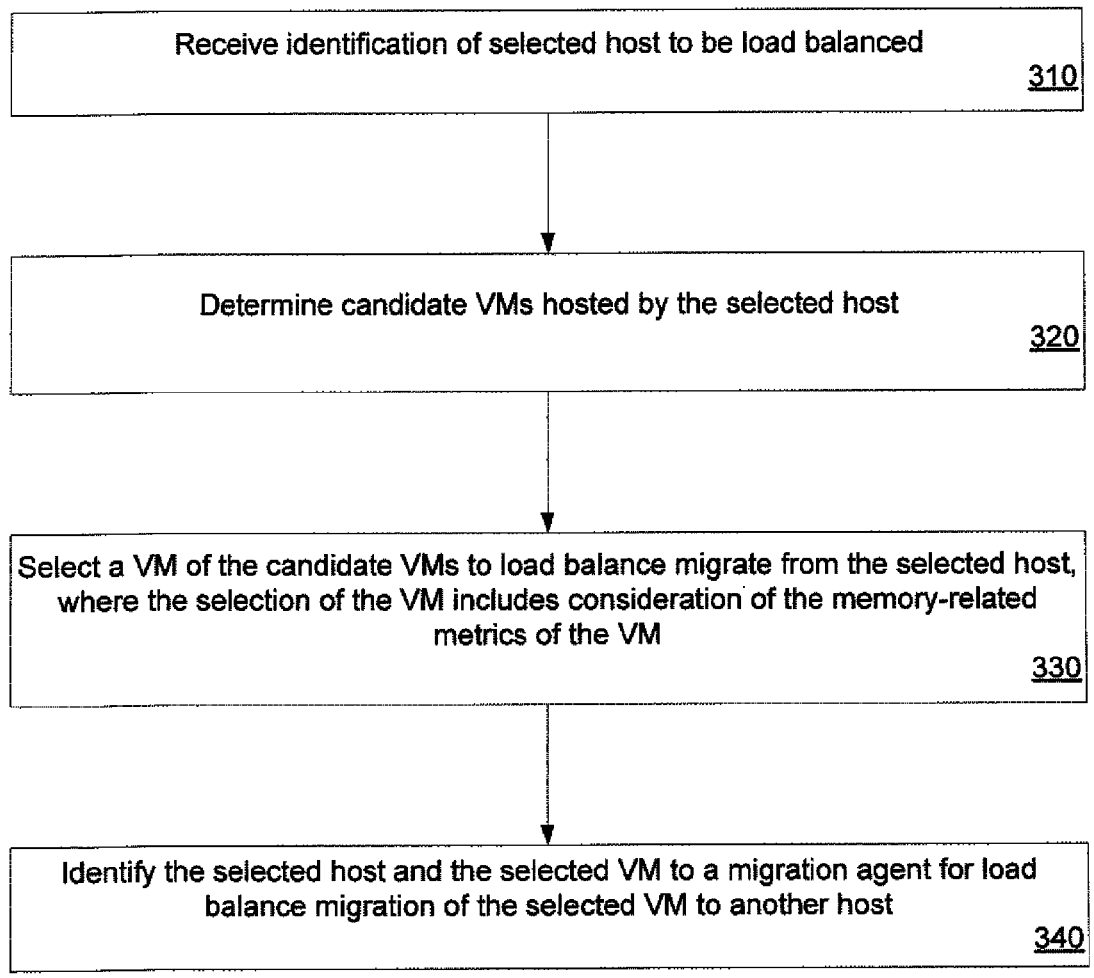
FIG. 3 is a flow diagram illustrating another method for shared memory history optimization in a host selection algorithm for VM placement.

FIG. 3 is a flow diagram illustrating another method 300 for load balancing in a memory-constrained virtualization system according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by load balancing agent 107 described with respect to FIG. 1.

Method 300 begins at block 310 where identification of a selected host to be load balanced is received. In one embodiment, the host is selected by method 200 described with respect to FIG. 2. Then, at block 320, candidate VMs hosted by the selected host are determined. In one embodiment, the candidate VMs are those VMs that are capable of being load balance migrated to another host.

At block 330, one of the candidate VMs is selected to be load balance migrated from the selected host. In embodiments of the invention, the selection of the VM includes consideration of memory-related metrics of the VM. For example, the VM selection may be extended to weigh: (1) the VMs with the smallest memory set, in order to provide the fastest migration from the selected host; (2) the VMs with the largest memory set, in order to alleviate as much memory as possible from the selected host; (3) the paging ratio incurred by each VM (as seen by the host), in order to reduce the overhead of VMs causing paging in the host; (4) the paging ratio incurred by each VM (as monitored in the VM), in order to reduce the I/O related to memory aspects; and/or (5) the level of shared memory the VM has with other VMs on the selected host.

Lastly, at block 340, identification of the selected host and the selected VM is provided to a migration agent for load balance migration of the selected VM to another host. In one embodiment, the migration agent is responsible for determine the other host that the selected VM will be migrated to, and such determination is outside of the scope of embodiments of the invention.

Figure 4:
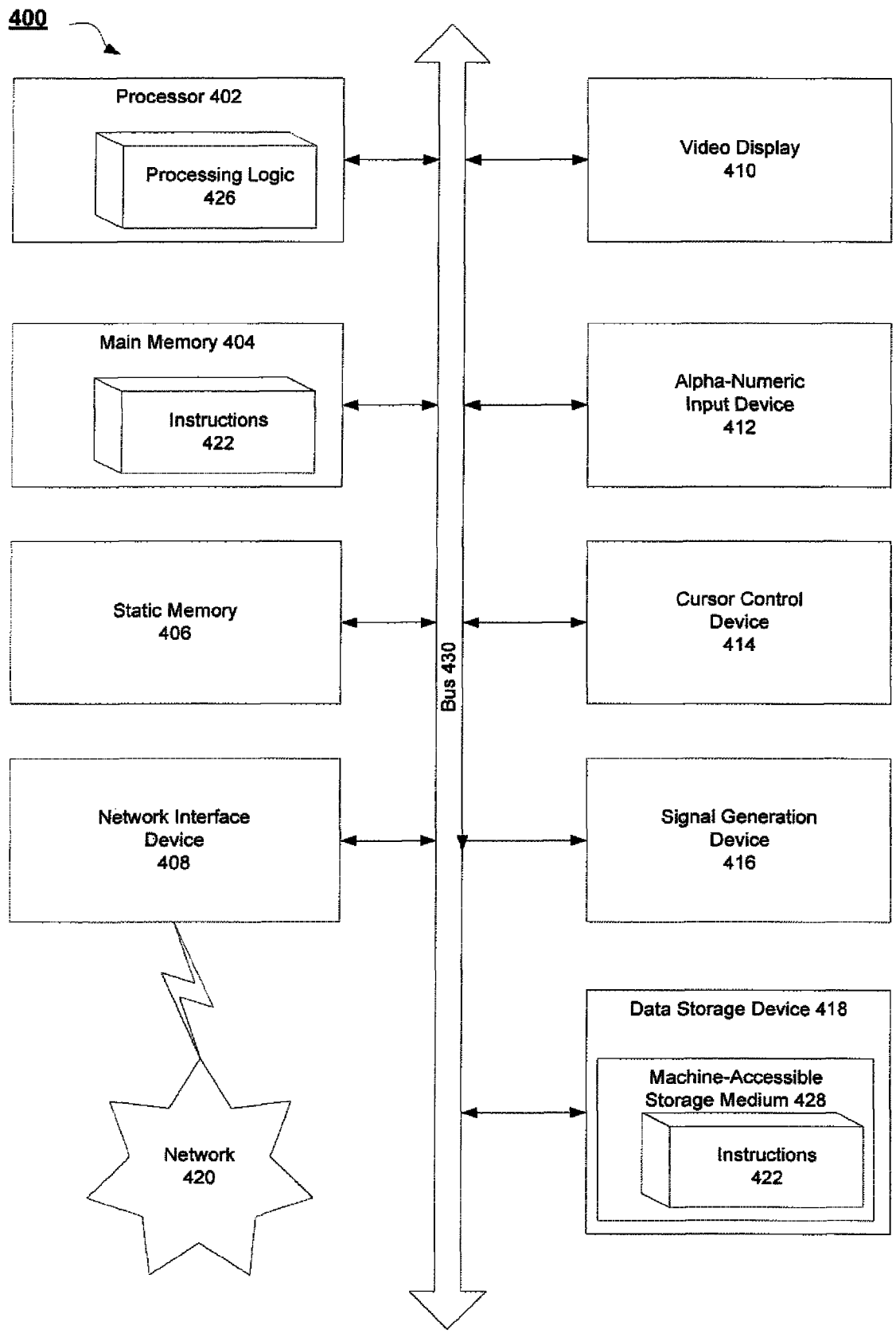
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform a shared memory history optimization in a host selection algorithm by a load balancing agent 107 as described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform load balancing in a memory-constrained virtualization system of methods 200 and 300 described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions.

The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    monitoring, by a host controller machine, metrics collected by the host controller machine, the metrics comprising memory-related metrics of host machines managed by the host controller machine and provided to the host controller machine by hypervisors managing virtual machines (VMs) on each of the host machines;
    determining, by the host controller machine, that the collected metrics have triggered a load balancing operation managed by the host controller machine, the triggering of the load balancing operation in view of failure of the collected metrics to satisfy configured conditions maintained by the host controller machine;
    selecting, by the host controller machine in view of memory-related metrics of the host machines, one of the host machines to participate in a migration process as part of the load balancing operation;
    analyzing, by the host controller machine, memory-related metrics of each of a plurality of VMs hosted by the selected host machine, wherein the memory-related metrics of the host machines and of the VM comprises at least one of an amount of memory utilization, over commit, swap usage, a paging ratio, or memory sharing; and
    selecting, by the host controller machine in view of the analyzing, a target VM of the plurality of VMs of the selected host machine to migrate from the selected host machine to a different host machine as part of the migration process of the load balancing operation, the selecting the target VM further comprising:
        selecting one of the VMs from the plurality of VMs that has a highest load balancing score;
        adjusting the load balancing score for the selected VM in view of at least one of a size of a memory set of the target VM, a paging ratio associated with the target VM as seen by the selected host machine, or a paging ratio experienced by the target VM;
        adjusting the load balancing score for the selected VM further in view of an amount of shared memory the VM has with the other VMs of the plurality of VMs hosted by the selected host machine;
        when the selected VM maintains the highest load balancing score among the plurality of VMs subsequent to the adjusting, identifying the selected VM as the target VM;
        when the selected VM does not have the highest load balancing score among the plurality of VMs subsequent to the adjusting, repeating the selecting the one of the VMs and the adjusting the load balancing score; and
        detecting and preventing loops of VM migration between the selected host machine and the different host machine.

2. The method of claim 1, further comprising providing identification of the selected host machine and the selected VM to a migration agent of the host controller machine in order for the migration agent to migrate the selected VM to the different host machine.

3. The method of claim 1, wherein if the VM has high shared memory with the other VMs of the plurality of VMs hosted by the selected host machine, then adjusting the load balancing score lower for the VM.

4. The method of claim 1, wherein if the VM has low shared memory with the other VMs of the plurality of VMs hosted by the selected host machine, then adjusting the load balancing score higher for the VM.

5. The method of claim 1, wherein the memory-related metrics for the host machines and the VM affect a load balancing score of the host machines and the load balancing score of the VM in the load balancing operation.

6. A system, comprising:
    a memory;
    a processing device communicably coupled to the memory; and
    a virtual machine (VM) load balancing agent executable from the memory and the processing device, the VM load balancing agent to:
        monitor metrics collected by the host controller machine, the metrics comprising memory-related metrics of host machines managed by the host controller machine and provided to the host controller machine by hypervisors managing virtual machines (VMs) on each of the host machines;
        determine that the collected metrics have triggered a load balancing operation managed by the host controller machine, the triggering of the load balancing operation in view of failure of the collected metrics to satisfy configured conditions maintained by the host controller machine;
        select, in view of memory-related metrics of the host machines, one of the host machines to participate in a migration process as part of the load balancing operation;
        analyze memory-related metrics of each of a plurality of VMs hosted by the selected host machine, wherein the memory-related metrics of the host machines and of the VM comprises at least one of an amount of memory utilization, over commit, swap usage, a paging ratio, or memory sharing; and
        select, in view of the analyzing, a target VM of the plurality of VMs of the selected host machine to migrate from the selected host machine to a different host machine as part of the migration process of the load balancing operation, the selecting the target VM further comprising:
            select one of the VMs from the plurality of VMs that has a highest load balancing score;
            adjust the load balancing score for the selected VM in view of at least one of a size of a memory set of the target VM, a paging ratio associated with the target VM as seen by the selected host machine, or a paging ratio experienced by the target VM;
            adjust the load balancing score for the selected VM further in view of an amount of shared memory the VM has with the other VMs of the plurality of VMs hosted by the selected host machine;

when the selected VM maintains the highest load balancing score among the plurality of VMs subsequent to the adjusting, identify the selected VM as the target VM;

when the selected VM does not have the highest load balancing score among the plurality of VMs subsequent to the adjusting, repeat the selecting the one of the VMs and the adjusting the load balancing score; and detect and prevent loops of VM migration between the selected host machine and the different host machine.

7. The system of claim 6, wherein the VM load balancing agent further to provide identification of the selected host machine and the selected VM to a migration agent of the host controller machine in order for the migration agent to migrate the selected VM to the different host machine.

8. The system of claim 6, wherein if the VM has high shared memory with the other VMs of the plurality of VMs hosted by the selected host machine, then adjusting the load balancing score lower for the VM.

9. The system of claim 6, wherein if the VM has low shared memory with the other VMs of the plurality of VMs hosted by the selected host machine, then adjusting the load balancing score higher for the VM.

10. A non-transitory machine-readable storage medium including instructions that, when accessed by a host controller machine, cause the host controller machine to perform operations comprising:

monitoring, by the host controller machine, metrics collected by the host controller machine, the metrics comprising memory-related metrics of host machines managed by the host controller machine and provided to the host controller machine by hypervisors managing virtual machines (VMs) on each of the host machines;

determining, by the host controller machine, that the collected metrics have triggered a load balancing operation managed by the host controller machine, the triggering of the load balancing operation in view of failure of the collected metrics to satisfy configured conditions maintained by the host controller machine;

selecting, by the host controller machine in view of memory-related metrics of the host machines, one of the host machines to participate in a migration process as part of the load balancing operation;

analyzing, by the host controller machine, memory-related metrics of each of a plurality of VMs hosted by the selected host machine, wherein the memory-related metrics of the host machines and of the VM comprises at least one of an amount of memory utilization, over commit, swap usage, a paging ratio, or memory sharing; and selecting, by the host controller machine in view of the analyzing, a target VM of the plurality of VMs of the selected host machine to migrate from the selected host machine to a different host machine as part of the migration process of the load balancing operation, the selecting the target VM further comprising:

selecting one of the VMs from the plurality of VMs that has a highest load balancing score;

adjusting the load balancing score for the selected VM in view of at least one of a size of a memory set of the target VM, a paging ratio associated with the target VM as seen by the selected host machine, or a paging ratio experienced by the target VM;

adjusting the load balancing score for the selected VM further in view of an amount of shared memory the VM has with the other VMs of the plurality of VMs hosted by the selected host machine;

when the selected VM maintains the highest load balancing score among the plurality of VMs subsequent to the adjusting, identifying the selected VM as the target VM;

when the selected VM does not have the highest load balancing score among the plurality of VMs subsequent to the adjusting, repeating the selecting the one of the VMs and the adjusting the load balancing score; and detecting and preventing loops of VM migration between the selected host machine and the different host machine.

11. The non-transitory machine-readable storage medium of claim 10, wherein the machine-readable storage medium includes data that, when accessed by the host controller machine, cause the host controller machine to perform operations further comprising identifying the selected host machine and the selected VM to a migration agent of the host controller machine in order for the migration agent to migrate the selected VM to another host machine.

12. The system of claim 6, wherein the memory-related metrics for the host machines and the VM affect a load balancing score of the host machines and the load balancing score of the VM in the load balancing operation.

13. The non-transitory machine-readable storage medium of claim 10, wherein if the VM has high shared memory with the other VMs of the plurality of VMs hosted by the selected host machine, then adjusting the load balancing score lower for the VM.

14. The non-transitory machine-readable storage medium of claim 10, wherein if the VM has low shared memory with the other VMs of the plurality of VMs hosted by the selected host machine, then adjusting the load balancing score higher for the VM.

15. The non-transitory machine-readable storage medium of claim 10, wherein the memory-related metrics for the host machines and the VM affect a load balancing score of the host machines and the load balancing score of the VM in the load balancing operation.

* * * * *